(12) United States Patent
Palmer et al.

(10) Patent No.: US 6,659,529 B2
(45) Date of Patent: Dec. 9, 2003

(54) CD VISOR

(75) Inventors: Christopher G. Palmer, Fremont, CA (US); Linda Graham, Cary, IL (US)

(73) Assignee: The Laserline Company, Norwalk, CT (US)

( * ) Notice: Subject to any disclaimer, the term of this patent is extended or adjusted under 35 U.S.C. 154(b) by 0 days.

(21) Appl. No.: 10/081,175

(22) Filed: Feb. 22, 2002

(65) Prior Publication Data

US 2003/0160474 A1 Aug. 28, 2003

(51) Int. Cl.[7] .................................................. B60J 3/00
(52) U.S. Cl. ...................... 296/97.6; 296/97.5
(58) Field of Search ............................... 296/97.5, 97.6; 224/312; D12/417

(56) References Cited

U.S. PATENT DOCUMENTS

| | | |
|---|---|---|
| 3,016,262 A | 1/1962 | Hunt |
| D362,159 S | 9/1995 | Singh |
| 5,503,316 A * | 4/1996 | Stewart |
| 5,590,827 A | 1/1997 | Nimpoeno |
| 5,653,364 A | 8/1997 | Eskandry |
| 5,711,469 A * | 1/1998 | Gormley et al. |
| D391,919 S | 3/1998 | Brassard |
| 5,762,246 A | 6/1998 | Drew |
| D400,847 S | 11/1998 | Brassard |
| D413,299 S | 8/1999 | Hartmann et al. |
| D415,731 S | 10/1999 | Bergh |
| 6,024,400 A | 2/2000 | Donoughe et al. |
| D432,490 S | 10/2000 | Golenz |
| D434,368 S | 11/2000 | Eskandry |
| D435,511 S | 12/2000 | Eskandry |
| D436,916 S | 1/2001 | Eskandry |

OTHER PUBLICATIONS

Catalog of Laserline portable CD storage cases from The Mead Corporation; date unknown; admitted to be prior art for the limited purpose of examination of this application.
Advertisement for CD visor organizer; date unknown; admitted to be prior art for the limited purpose of examination of this application.

* cited by examiner

Primary Examiner—Stephen T. Gordon
Assistant Examiner—Scott Carpenter
(74) Attorney, Agent, or Firm—St. Onge Steward Johnston & Reens LLC

(57) ABSTRACT

A storage visor including a body portion and a plurality of overlapping flaps coupled to the body portion and forming a plurality of storage slots located between adjacent ones of the flaps. The storage visor further includes an expandable pocket coupled to the body portion, the pocket including at least one surface made of an elastic material.

19 Claims, 8 Drawing Sheets

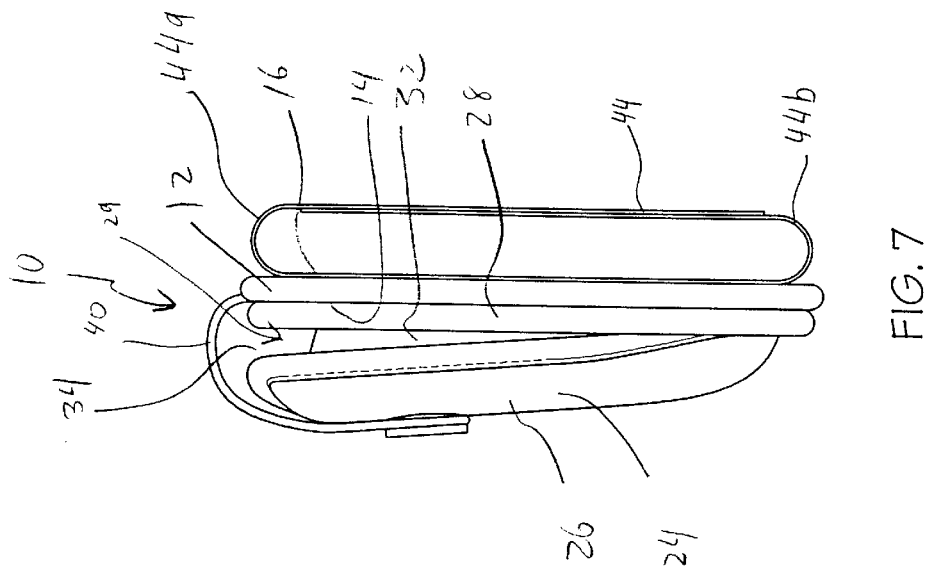
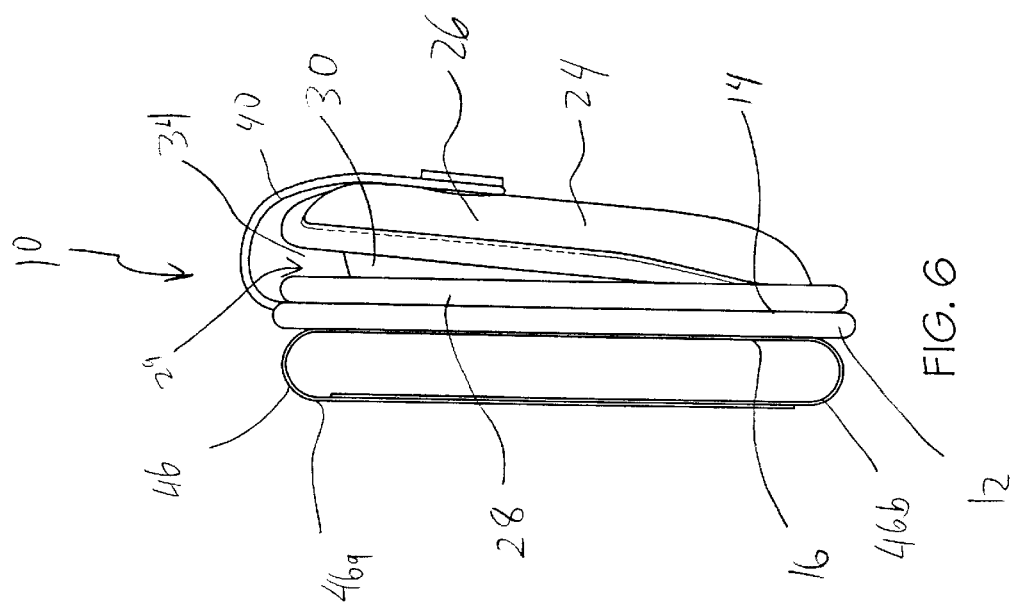

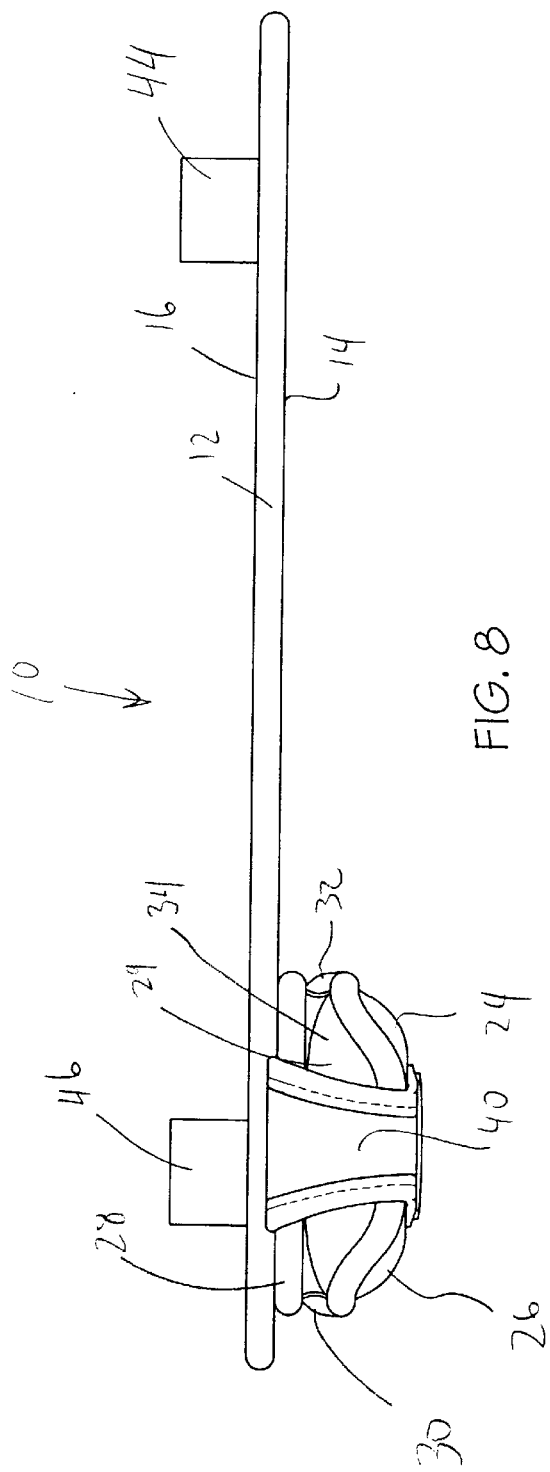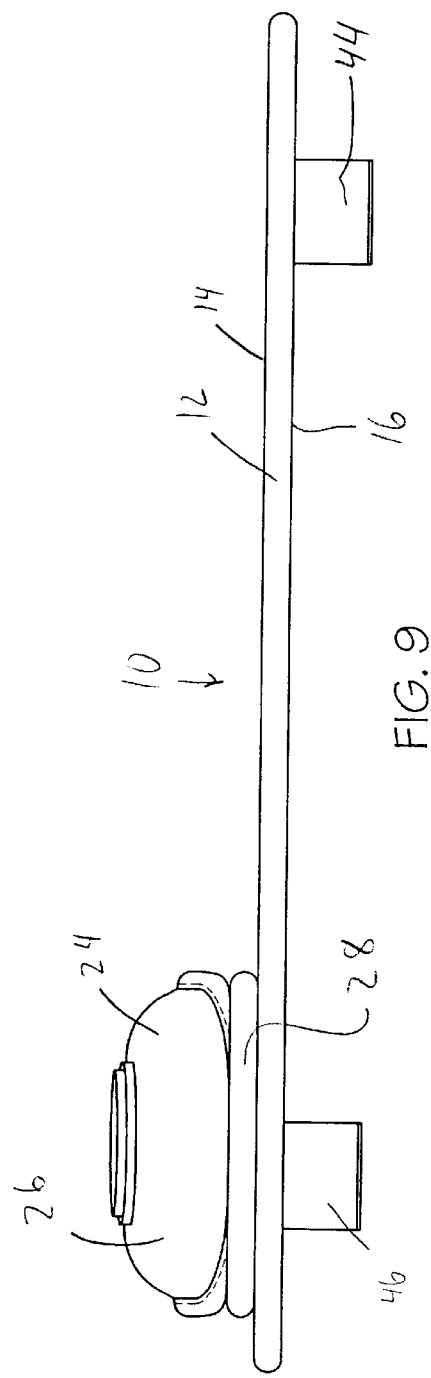

CD VISOR

The present invention is directed to a storage visor for storing a plurality of media storage devices, and more particularly, to a storage visor for storing a plurality of media storage devices and for being coupled to a sunshade of a vehicle.

BACKGROUND OF THE INVENTION

Media storage devices, such as compact disks ("CDs"), optical disks, digital video disks or digital versatile disks ("DVDs"), computer diskettes and the like are widely used to store various information and data, such as, music or movies. Media storage players, such as compact disk players and digital video disk players, can read the information and data stored on a media storage device and provide an output, such as a computer program or sound and video displays. Many media storage players are now commonly found in homes and vehicles, and may also be used as portable devices. Accordingly, there is a need for a visor for storing a plurality of media storage devices therein such that the stored media storage devices can be securely stored in a vehicle or another location.

SUMMARY OF THE INVENTION

The present invention is a storage visor for storing a plurality of media storage devices therein. In one embodiment, the storage visor includes an expandable end pocket that may be sized to receive, for example, a cellular phone or sunglasses therein. In one embodiment, the storage visor includes a pocket located on a rear surface thereof.

In one embodiment, the invention is a storage visor including a body portion and a plurality of overlapping flaps coupled to the body portion and forming a plurality of storage slots located between adjacent ones of the flaps. The storage visor may further include an expandable pocket coupled to the body portion, the pocket including at least one surface made of an elastic material.

Other objects and advantages will be apparent from the following description and accompanying drawings.

BRIEF DESCRIPTION OF THE DRAWINGS

FIG. 6 is a left side view of the storage visor of FIG. 3;

FIG. 7 is a right side view of the storage visor of FIG. 3;

FIG. 8 is a top view of the storage visor of FIG. 3;

FIG. 9 is a bottom view of the storage visor of FIG. 3; and

DETAILED DESCRIPTION OF THE INVENTION

Figure 1:
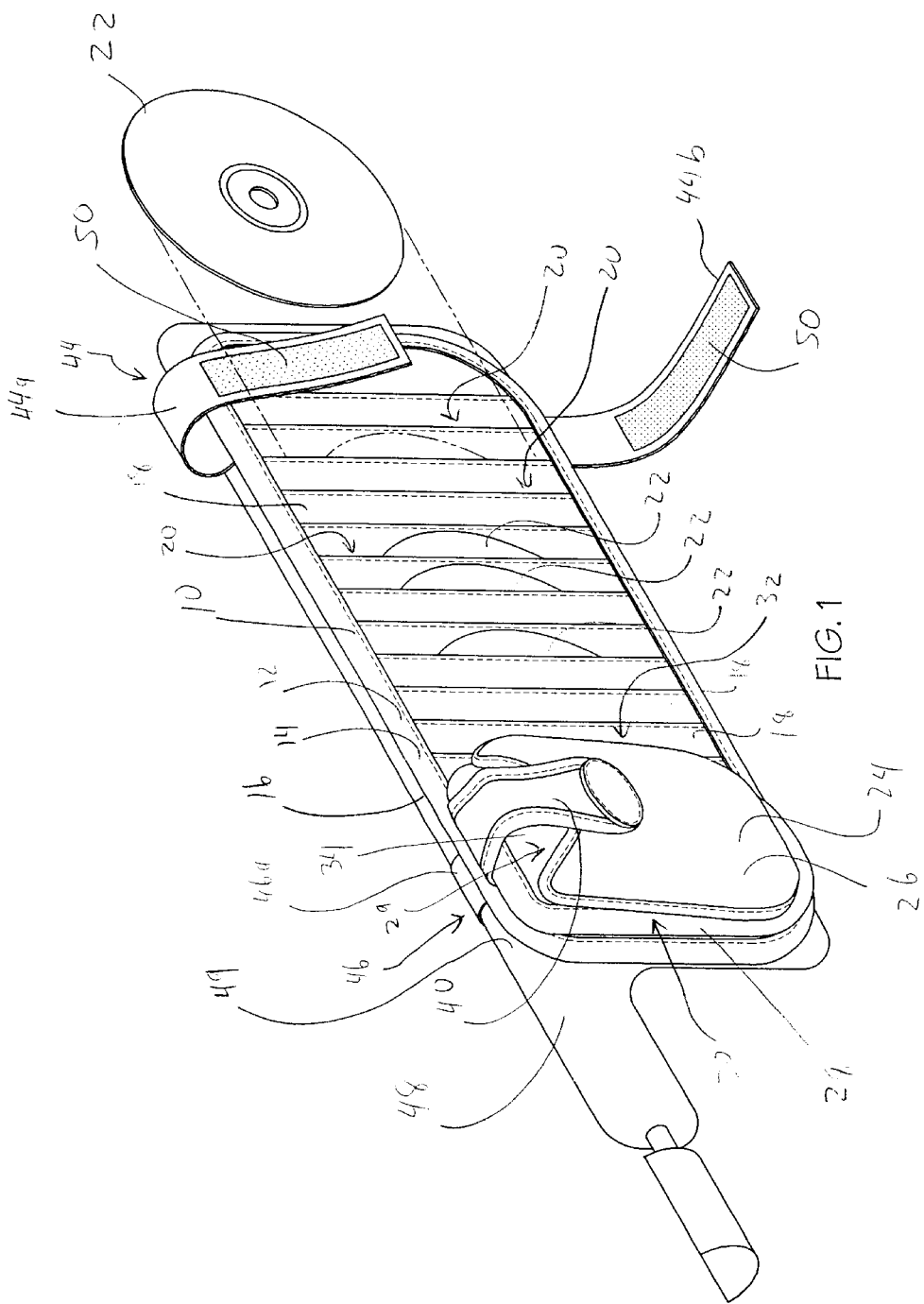
FIG. 1 is a front perspective view of one embodiment of the storage visor of the present invention, illustrated receiving various CDs therein and attached to a vehicle sunshade.

As shown in FIGS. 1–9, the present invention is a storage visor, generally designated 10, which includes a generally rectangular body portion 12 having a front surface 14 and a rear surface 16. The storage visor 10 includes a plurality of at least partially overlapping flaps 18 coupled to the body portion 12 to form a plurality of storage slots 20, each storage slot 20 being located between adjacent ones of the flaps 18. In this manner, a CD 22 or other media storage device can be located in each of the storage slots 18, as shown in FIG. 1.

The storage visor 10 may include an end pocket 24 coupled to the body portion 12, and the pocket 24 may be sized and shaped to closely receive a cellular phone, sunglasses, or other similarly shaped component therein. In one embodiment, the pocket 24 is generally rectangular in front view and has a height-to-width ratio of about 2:1. When the storage visor 10 is used in a vehicle, the end pocket 24 provides a convenient pocket for storing a cellular phone, sunglasses (both of which are, of course, often used or stored inside a vehicle) and the like in an easily accessible location.

The pocket 24 may include a front surface 26 and a rear surface 28 forming a cavity 29 therebetween. The pocket 26 may include a pair of sides 30, 32 coupled to and extending between the front 26 and rear surfaces 28. The front 26 and rear 28 surfaces may be coupled together at their bottom edges and be spaced away from each other at their top edges to form a mouth 34 which provides access to the cavity 29.

The mouth 34 of the pocket may extend in a direction generally perpendicular to the direction of the storage slots 20. The sides 30, 32 may be elastic such that the front surface 26 can be moved away from the rear surface 28, and the elastic sides 30, 32 thereby stretched, in order to increase the capacity of the pocket 24. The pocket 24 may include a closure flap 40 that is movable between a closed position (FIG. 1) wherein the closure flap 40 spans the mouth 34 to retain items in the pocket 24, and an open position (FIG. 2) wherein the closure flap 40 does not span the mouth 34 to allow items to be placed into or removed from the cavity 29.

The visor 10 may include a pair of attachment loops 44, 46 coupled to opposite ends of the body 12. Each attachment loop 44, 46 may include a pair of straps 44a, 44b, and 46a, 46b coupled to the rear surface 16 that can be coupled together and located around a sunshade or visor 48 of a vehicle (See FIG. 1) to mount the storage visor 10 to the sunshade 48. For example, each of the attachment straps 44a, 44b, 46a, 46b may include a patch 50 of a hook-and-loop fastening material, such as VELCRO®, located thereon such that the patches 50 can cooperate to couple the straps 44a, 44b, 46a, 46b together. However, it should be understood that a wide variety of structure may be used to couple the straps 44a44b, 46a, 46bof each attachment loop 44, 46 together, such as a variety of clasps, snaps, hooks, buttons, fasteners, loops, ties and the like. Furthermore, the loops 44, 46 may be made of an elastic material to enable the loops 44, 46 to fit over a wide variety of sizes of sunshades, or to eliminate the need to separate each loop 44, 46 into separate straps to fit the loops over a sunshade. Furthermore, instead of a pair of loops, a single, longer loop, similar to a sleeve, may be utilized. The visor 10 may include any of a variety of other structures for coupling the visor 10 to a sunshade, such as clips, brackets, flaps, hook-and-loop fasteners and the like.

Figure 5:
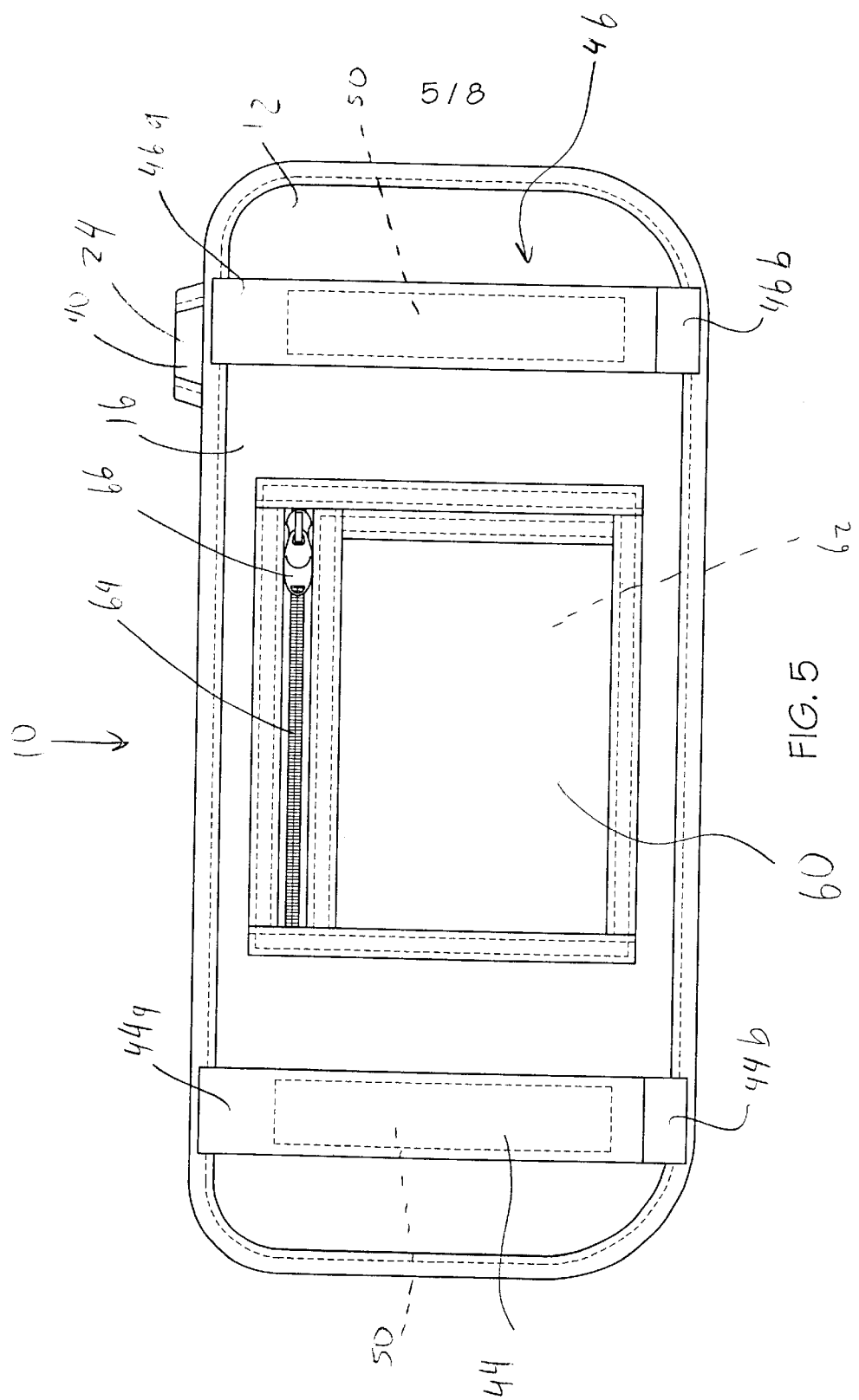
FIG. 5 is a back view of the storage visor of FIG. 3.

As shown in FIG. 5, the visor 10 may include a rear pocket 60 located on the rear surface 16 of the body 12. The rear pocket 60 may include an inner cavity 62 and a mouth 64 that can be selectively opened and closed by a fastener, such as a zipper 16. When the visor 10 is coupled to the sunshade 48 of a vehicle, as shown in FIG. 1, the rear pocket 60 abuts against or is located adjacent to a front surface 49 of the sunshade 48 and is thus hidden from view. Accordingly, the rear pocket 60 can serve as a relatively secure location in which papers can be stored. The rear pocket 60 is also relatively easily accessible, and accordingly, papers associated with a vehicle which may need to be accessed from time to time, such as registration, title, insurance papers and the like may be stored in the rear pocket 10.

Figure 2:
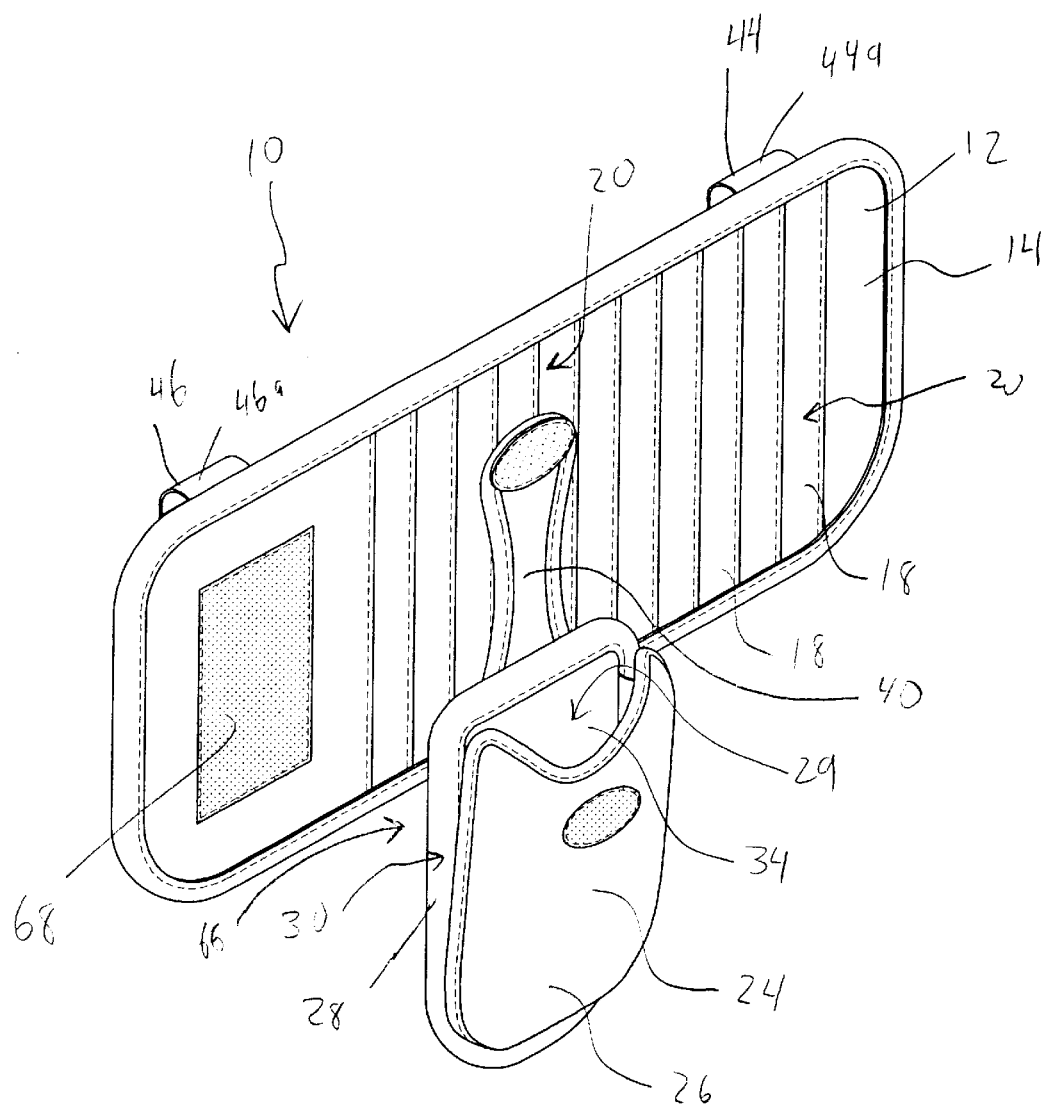
FIG. 2 is a front view of the storage visor of FIG. 1, illustrating the end pocket in its detached condition.
Figure 3:
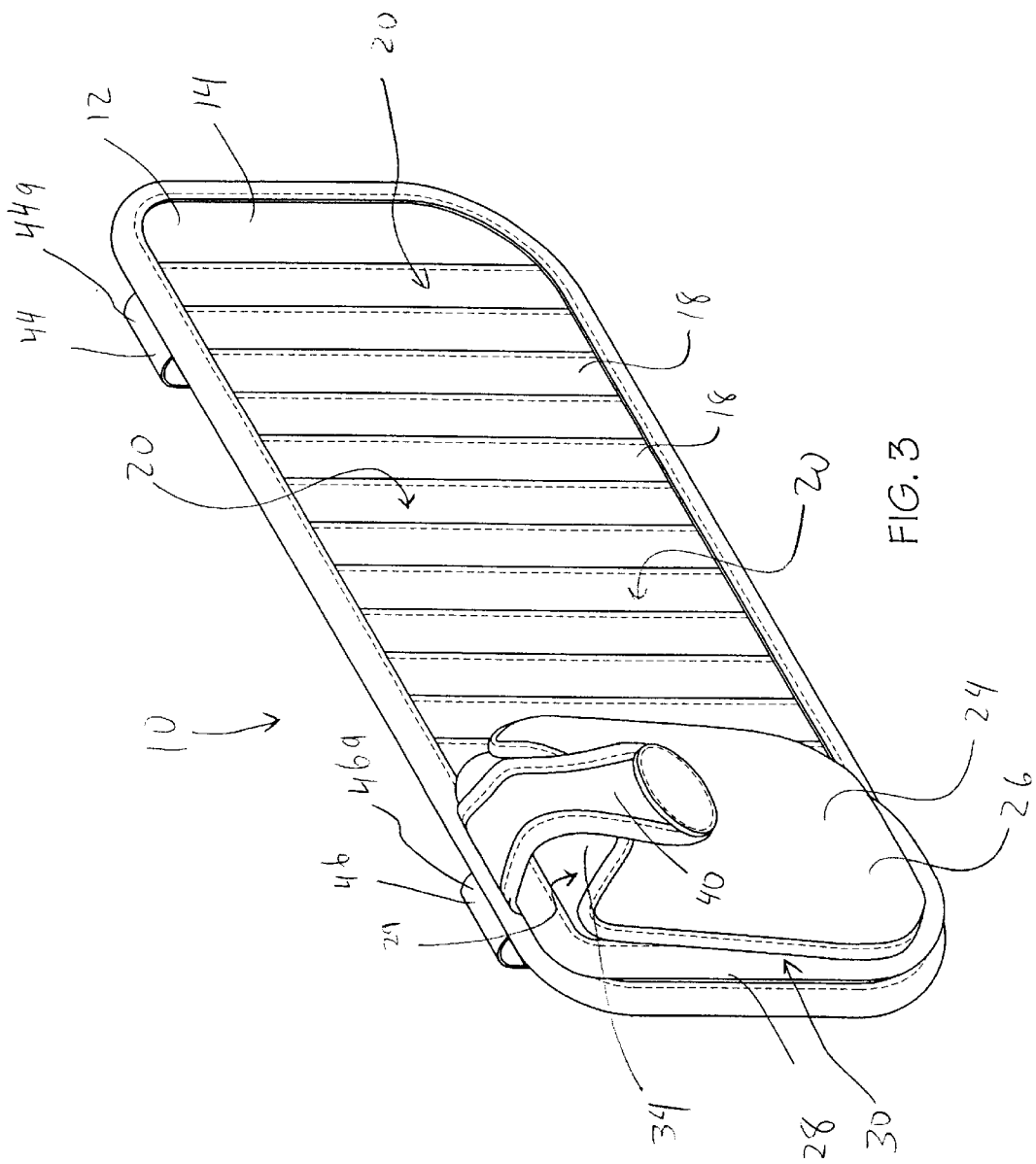
FIG. 3 is a front perspective view of the storage visor of FIG. 1.
Figure 4:
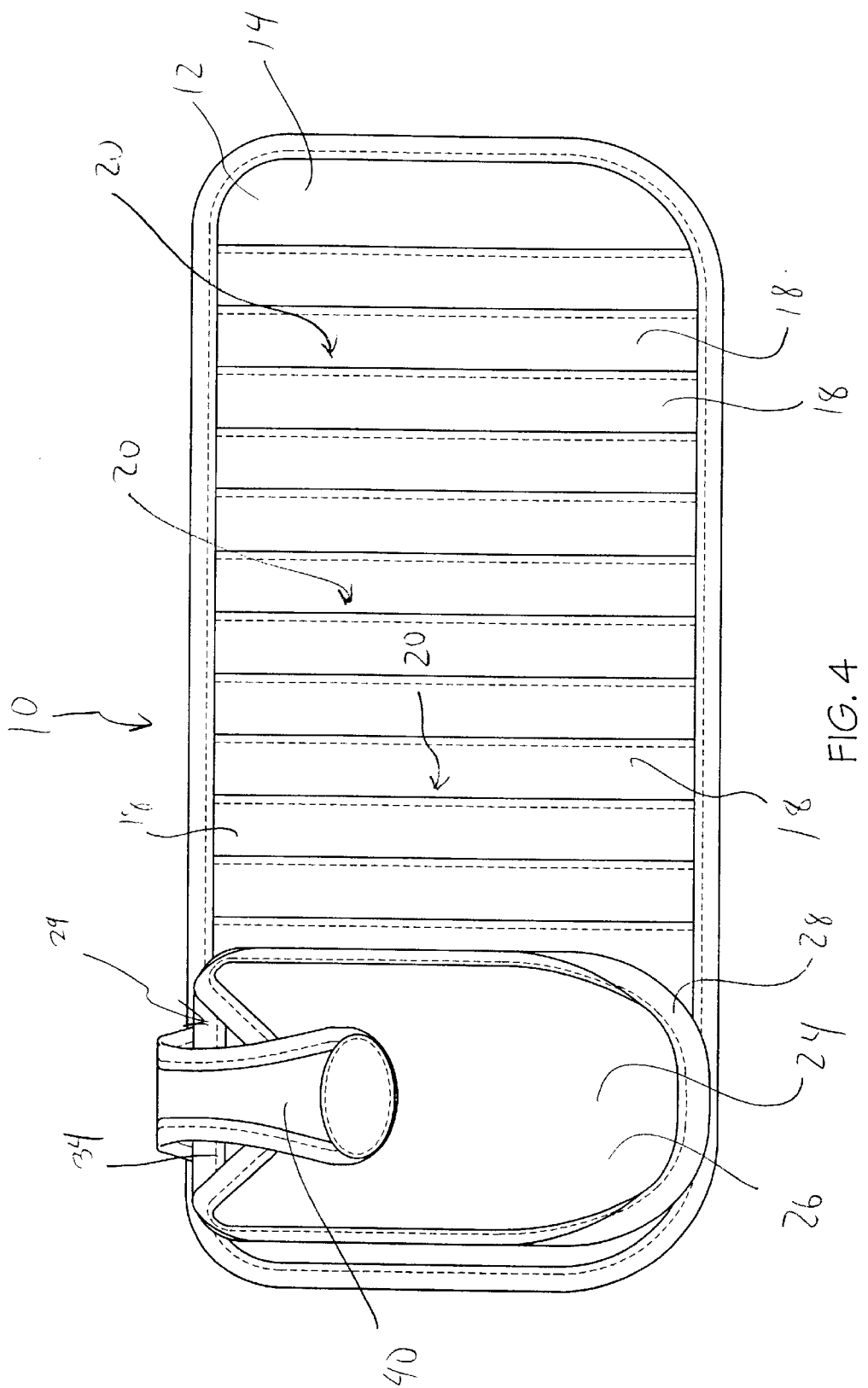
FIG. 4 is a front view of the storage visor of FIG. 3.

As shown in FIG. 2, in one embodiment the pocket 26 is detachably coupled to the body 12 of the storage visor 10. For example, the pocket 26 may include a patch 66 of hook-and-loop fastening material, such as VELCRO® located thereon (see FIG. 10), and the body portion 12 may include a corresponding patch 68 of hook-and-loop fastening material (see FIG. 2). In this manner, the pocket 26 can be detached from the body portion 12 of the storage visor 10 such that the user can carry the pocket 26 and use the pocket 26 to store sunglasses, a cellular phone, or other components therein. When the user returns to the vehicle, the pocket 26 can then be reattached to body portion 12 for further use with the storage visor 10.

Figure 10:
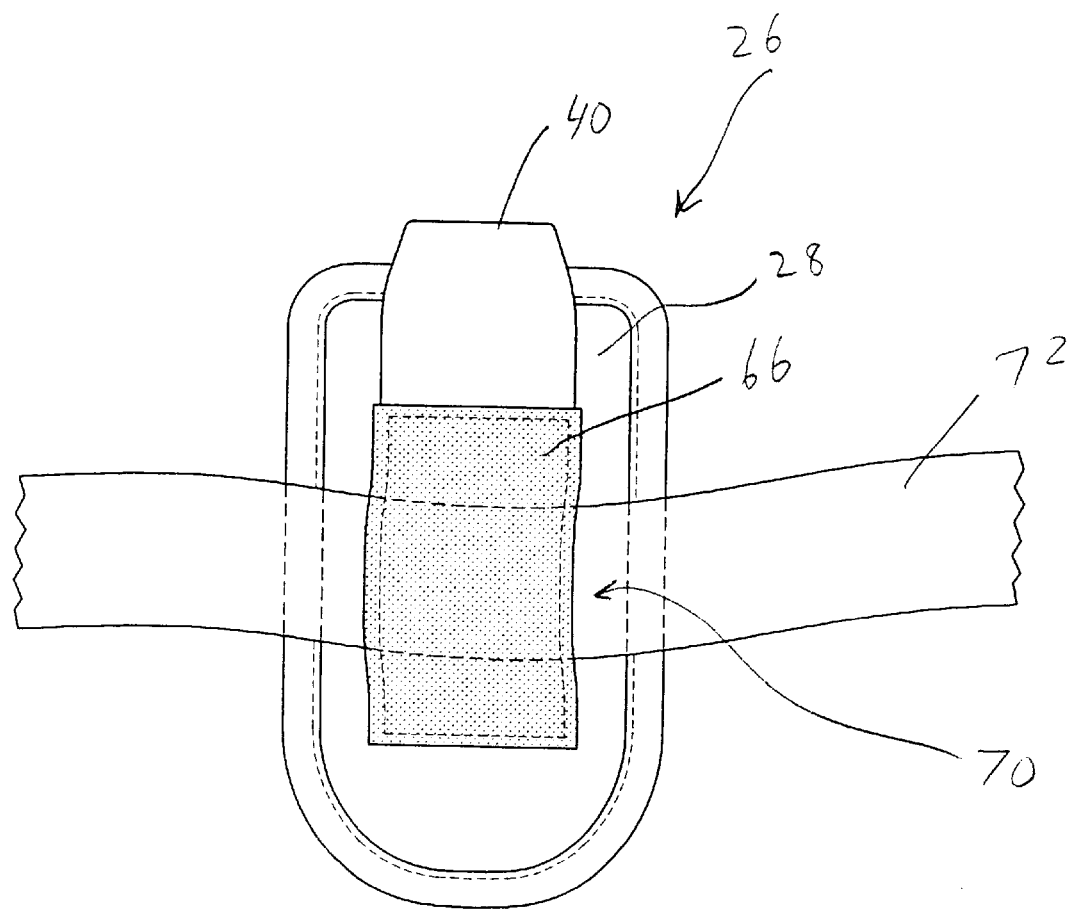
FIG. 10 is a rear view of the end pocket of the storage visor, receiving a belt therethrough.

As shown in FIG. 10, the pocket 26 may include an opening 70 located on its rear surface 28. In the illustrated embodiment, the opening 70 is formed between the patch 66 and the rear surface 28 of the pocket 26, although the opening 70 can be formed by a variety of methods, including, for example, forming a slit in the rear surface 28, providing a loop, etc. The opening 70 is preferably sized and shaped to receive a belt 32 therethrough. In this manner, the pocket 26 can be attached to the belt of a user that is located around the user's waist and stored thereon when the pocket 26 is used separately from the body portion 12 of the storage visor 10. Once the user returns to the vehicle and desires to reattach the pocket 26 to the body portion 12, the belt 32 is slid from the opening 70, and the pocket 26 can be coupled to the body portion 12 by the patches 66, 68.

Having described this invention in detail and by reference to the preferred embodiments, it will be apparent that modifications and variations thereof are possible without departing from the scope of the invention.

What is claimed is:

1. A storage visor comprising:
   a generally flat, rectangular body portion;
   a plurality of overlapping flaps coupled to said body portion and forming a plurality of storage slots, each storage slot being located between adjacent ones of said flaps;
   an expandable front pocket coupled to said body portion, said front pocket including at least one surface made of an elastic material to enable said front pocket to expand;
   wherein said flaps and said front pocket are located on a front surface of said body, and wherein said visor further includes a rear Docket located on a rear surface of said body such that said rear pocket is located adjacent to a vehicle sunshade when said storage visor is coupled to said sunshade; and
   wherein said rear pocket includes an inner cavity, a mouth, and a zipper for selectively closing and opening said mouth.

2. The storage visor of claim 1 wherein said front pocket is generally rectangular in front view and has a height-to-width ratio of about 2:1.

3. The storage visor of claim 1 wherein said front pocket includes a front surface, a rear surface, and a pair of sides, each side being coupled to and extending between said front and rear surfaces, and wherein each side is generally elastic.

4. The storage visor of claim 3 wherein said front surface and said rear surface of said front pocket are directly joined together at a bottom edge thereof, and are spaced away from each other at a top edge thereof.

5. The storage visor of claim 1 wherein said front pocket includes an inner cavity and a mouth that extends in a direction generally perpendicular to said storage slots, and wherein said front pocket further includes a closure flap that movable between a closed position wherein said closure flap at least partially covers said mouth to retain items in said front pocket, and an open position wherein said closure flap does not cover said mouth.

6. The storage visor of claim 1 further comprising means coupled to said body for coupling said visor to a vehicle sunshade.

7. The storage visor of claim 1 further comprising a pair of attachment loops coupled to said body, each attachment loop being shaped to fit around a vehicle sunshade to couple said visor to said sunshade.

8. The storage visor of claim 1 wherein each attachment loop includes a pair of elastic straps that are releasably attachable together.

9. The storage visor of claim 1 wherein said front pocket includes an opening on a rear surface thereof, said opening being sized to receive a belt therethrough.

10. A storage visor comprising:
    a generally flat, rectangular body portion having a front surface and a rear surface;
    a plurality of overlapping flaps located on said front surface and forming a plurality of storage slots, each storage slot being located between adjacent ones of said flaps; and
    a rear pocket located on said rear surface said body portion such that said rear pocket is located adjacent to a vehicle sunshade when said storage visor is coupled to said sunshade, and
    the storage visor of claim 1 wherein said rear pocket includes an inner cavity, a mouth, and a zipper for selectively closing and opening said mouth.

11. The storage visor of claim 10 further comprising a front pocket located on said front surface.

12. The storage visor of claim 11 wherein said front pocket includes a front surface, a rear surface, and a pair of sides, each side being coupled to and extending between said front and rear surfaces, and wherein each side is elastic.

13. The storage visor of claim 10 further comprising means coupled to said body for coupling said visor to a vehicle sunshade.

14. The storage visor of claim 10 further comprising a pair of elastic attachment loops coupled to said body, each attachment loop being shaped to fit around a vehicle sunshade to couple said visor to said sunshade.

15. A storage visor comprising:
    a generally flat, rectangular body portion;
    a plurality of overlapping flaps coupled to said body portion and forming a plurality of storage slots, each storage slot being located between adjacent ones of said flaps;
    a front pocket coupled to said body portion, said front pocket including a rear surface located adjacent to said body portion, said rear surface including a opening located thereon and being shaped to receive a belt therethrough;
    wherein said flaps and said front pocket are located on a front surface of said body, and wherein said visor further includes a rear pocket located on a rear surface of said body such that said rear pocket is located adjacent to a vehicle sunshade when said storage visor is coupled to said sunshade; and wherein said rear pocket includes an inner cavity, a mouth, and a zipper for selectively closing and opening said mouth.

16. The storage visor of claim 15 wherein said opening is located between said rear surface and said body portion.

17. The storage visor of claim 15 wherein said front pocket includes a front surface, a rear surface, and a pair of sides, each side being coupled to and extending between said front and rear surfaces, and wherein each side is generally elastic.

18. The storage visor of claim 15 further comprising a pair of attachment loops coupled to said body, each attachment loop including a pair of straps that are attachable together to couple said visor to a vehicle sun shade.

19. A storage visor comprising:

a generally flat, rectangular body portion having a front surface and a rear surface;

a plurality of overlapping flaps coupled to said front surface of said body portion and forming a plurality of storage slots, each storage slot being located between adjacent ones of said flaps;

an expandable front pocket coupled to said front surface of said body portion, said front pocket including at least one surface made of an elastic material to enable said front pocket to expand, said front pocket including a rear surface located adjacent to said front surface of said body portion, said rear surface including a opening located thereon, said opening being shaped to receive belt therethrough;

a rear pocket located on said rear surface of said body such that said rear pocket is located adjacent to a vehicle sunshade when said storage visor is coupled to said sunshade; and wherein said rear Pocket includes an inner cavity, a mouth, and a zipper for selectively closing and opening said mouth.

* * * * *